Patented Nov. 25, 1930

1,782,471

UNITED STATES PATENT OFFICE

WALTER KIRCHNER, OF BERLIN-GRUNAU, GERMANY, ASSIGNOR TO CHEMISCHE FABRIK GRÜNAU LANDSHOFF & MEYER AKTIENGESELLSCHAFT, OF BERLIN-GRUNAU, GERMANY

MEANS FOR AND PROCESS OF ACCELERATING THE HARDENING OF HYDRAULIC BINDING MEANS

No Drawing. Application filed March 21, 1927, Serial No. 177,216, and in Germany January 11, 1927.

It is sometimes of the greatest importance, when work is carried out with hydraulic binding means of various kinds, as the production of concrete stones, erection of buildings, channels, tunnels and the like, that the hardening of the hydraulic binding means shall take place as rapidly as possible, especially when the work has to be completed in the shortest possible time, for instance owing to internal or external rush of water. Rapid hardening, accompanied by good final resistance, is sometimes of the greatest importance also in manufacturing goods from artificial stone, as buttons, plates and terrazzo, owing to the considerable economy in moulds or complicated apparatus, as hydraulic presses and the like.

It has long been known that chloride of calcium possesses the valuable property of making hydraulic binders, especially cements, rapidly setting. As generally known, chloride of calcium acts quite differently with different cements and it has happened that by chloride of calcium the cement has been destroyed and the setting time has been lengthened.

It has been found that the effect of the chloride of calcium can be substantially improved by addition of aluminium chloride. There exist only very few publications about the effect of the aluminium chloride upon hydraulic binding means and cement; in the "Bauingenieur" 1924, page 417 it is stated, for instance, that aluminium chloride not only reduces the resistance but lengthens the setting time.

The present invention is, therefore, the more surprising as the addition of aluminium chloride to the chloride of calcium leads to a considerable acceleration of the setting time; the mortar prepared with aluminium chloride addition possessing further high resisting capability and adherence.

The new means for accelerating the hardening of hydraulic binding means consists in a mixture of soluble calcium and aluminium salts, principally of mixtures of the chlorides or of the nitrates of the calcium and of the aluminium, also alternatively.

The mixtures may be mixed with the hydraulic binding means before or while carrying out construction with them. Solutions of such mixtures in water may be used as liquid additions. By varying the concentrations of such solutions the beginning and duration of setting is regulated, as desired. Such regulating also is possible by varying proportions of the components of the mixture.

As proof for the above statements the following example may be given:

A Portland cement which, mixed with water, requires normally 4 hours up to the beginning and 8 hours up to the termination of the setting, begins, if admixed with a solution of chloride of calcium saturated in cold state, to set after 1 hour, the setting being finished after more than 8 hours. When this saturated solution is diluted with 1 part water the setting begins after 10 minutes and is finished after more than 2 hours. Diluted with two parts water the setting begins after five minutes and is finished after one hour, diluted with 4 parts water the setting begins after 15 minutes and is finished after 1½ hours. When diluted with eight parts water there can be scarcely ascertained any effect of the chloride of calcium.

Aluminium chloride gives quite different results according to the temperature and kind of cement, as has been stated in the above mentioned publication.

The normal Portland cement used for counter-tests to this example showed, with addition of an aluminium chloride solution saturated in cold state, instantaneous beginning of the setting but no distinct end of the same. Diluted with 1 part water the setting started after 10 minutes and more than two hours were required for the completion of the setting.

When equal parts of solutions of the two salts, saturated in cold state, are mixed this mixture gives with the above cement instantaneous final setting the duration of which is so short that it can not be accurately determined. At dilution with one part water setting begins after one minute and ends 15 minutes thereafter; with two parts water the setting began in two minutes and ended in 55 minutes. A mixture of, for instance, four parts of concentrated solution of chloride of calcium with one part of concentrated aluminium chloride solution produced, when the undiluted solution was used, instantaneous hardening the duration of which could be determined. Diluted with one part of water the hardening did begin after one minute and was completed after 10 minutes. With two parts of water the setting started after two minutes and ended in about 45 minutes.

The above indications prove the surprising acceleration of the setting which is due to the addition of aluminium chloride to chloride of calcium. This means an extraordinarily great technical progress over the commonly used methods with chloride of calcium alone or with other less effective additions, as calcium nitrate, sugar and the like.

Similar effects are to be obtained also by application of the nitrates. The new improving substance may be added to the hydraulic cements also prior to using the same in any suitable manner.

I claim:—

1. A process for accelerating the hardening of cement which comprises adding to the cement a mixture of calcium chloride and aluminum chloride, and permitting the resulting mixture to harden.

2. A process for accelerating the hardening of cement which comprises adding to the cement a mixture of substantially equal parts of calcium and aluminum chlorides.

3. A process for accelerating the hardening of cements which comprises adding to the cement a mixture of calcium and aluminum chlorides in the solid state.

4. A process for the acceleration of the hardening of cement which comprises adding to the cement regulated amounts of calcium and aluminum chlorides to control the time of setting of the cement.

5. A process of forming a cement mix having the property of setting at a predetermined time, which comprises adding to the cement predetermined quantities of calcium and aluminum chlorides to regulate the setting time of the mix.

6. A process of forming a cementitious composition which comprises forming a mix of Portland cement and adding thereto while working a mixture of calcium and aluminum chloride in substantially equal amounts, thereby accelerating the setting time of the composition.

7. A cementitious composition comprising a cement together with calcium and aluminum chlorides in quantities sufficient to accelerate the setting of the cement.

8. A cementitious composition comprising Portland cement in combination with calcium and aluminum chlorides in quantities sufficient to accelerate the setting of the cement.

In testimony whereof I affix my signature.

WALTER KIRCHNER.